US009378608B2

(12) United States Patent
Enzminger et al.

(10) Patent No.: US 9,378,608 B2
(45) Date of Patent: Jun. 28, 2016

(54) PROGRESSIVE GAMING SYSTEM, APPARATUS AND METHOD PROVIDING A PRIMARY GAME IN CONJUNCTION WITH AN INDEPENDENT PROGRESSIVE GAME

(75) Inventors: Joseph R. Enzminger, Austin, TX (US); Nimai Malle, Austin, TX (US); Clifton Lind, Austin, TX (US); Brendan O'Connor, Austin, TX (US)

(73) Assignee: EVERI GAMES, INC., Austin, TX (US)

( * ) Notice: Subject to any disclaimer, the term of this patent is extended or adjusted under 35 U.S.C. 154(b) by 1077 days.

(21) Appl. No.: 12/772,726

(22) Filed: May 3, 2010

(65) Prior Publication Data

US 2010/0216537 A1 Aug. 26, 2010

Related U.S. Application Data

(63) Continuation of application No. 11/008,533, filed on Dec. 9, 2004, now Pat. No. 7,708,639.

(60) Provisional application No. 60/530,328, filed on Dec. 17, 2003.

(51) Int. Cl.
*G06F 17/00* (2006.01)
*G07F 17/32* (2006.01)

(52) U.S. Cl.
CPC ............ *G07F 17/32* (2013.01); *G07F 17/3258* (2013.01)

(58) Field of Classification Search
CPC ................................ A63F 13/00; A63F 13/10
USPC ............. 463/1, 16–22, 24–29, 33, 42–43, 47; 273/138.1, 138.2, 139, 141 A, 269, 273/454–456, 460–461
IPC ............................................. A63F 13/00, 13/10
See application file for complete search history.

(56) References Cited

U.S. PATENT DOCUMENTS

| | | | |
|---|---|---|---|
| 5,046,737 | A | 9/1991 | Fienberg |
| 5,112,050 | A | 5/1992 | Koza et al. |
| 5,158,293 | A | 10/1992 | Mullins |

(Continued)

OTHER PUBLICATIONS

International Search Report dated Feb. 10, 2006, in PCT application No. PCT/US04/41772 (3 pages).

(Continued)

*Primary Examiner* — Paul A D'Agostino
(74) *Attorney, Agent, or Firm* — Russell D. Culbertson, Esq.; Nathan Calvert, Esq.; JP Cody, Esq.

(57) ABSTRACT

A system, apparatus, and method are disclosed that include generating a set of primary game outcomes with each primary game outcome being associated with a result in a primary game. A set of progressive prize bearing outcomes are associated with the set of first game outcomes according to a progressive win frequency rule. Each progressive prize bearing record is associated with a progressive win indicator and a progressive prize. A primary game outcome is determined in response to a game play request by a player. If the primary game outcome is associated with a winning result, the player is provided a corresponding award; independent of the primary game result, if the primary game outcome is associated with one of the progressive prize bearing records, the player is awarded a corresponding progressive prize.

14 Claims, 5 Drawing Sheets

(56) References Cited

U.S. PATENT DOCUMENTS

| | | | | |
|---|---|---|---|---|
| 5,282,620 | A | 2/1994 | Keesee | |
| 5,324,035 | A | 6/1994 | Morris et al. | |
| 5,417,430 | A | 5/1995 | Breeding | |
| 5,645,486 | A | 7/1997 | Nagao et al. | |
| 5,766,076 | A | 6/1998 | Pease et al. | |
| 5,855,515 | A | 1/1999 | Pease et al. | |
| 5,885,158 | A | 3/1999 | Torango et al. | |
| 6,017,032 | A | 1/2000 | Grippo et al. | |
| 6,024,640 | A | 2/2000 | Walker et al. | |
| 6,146,272 | A | 11/2000 | Walker et al. | |
| 6,210,276 | B1 * | 4/2001 | Mullins | A63F 3/00157 463/17 |
| 6,220,961 | B1 | 4/2001 | Keane et al. | |
| 6,224,484 | B1 | 5/2001 | Okuda et al. | |
| 6,241,608 | B1 | 6/2001 | Torango | |
| 6,375,567 | B1 * | 4/2002 | Acres | G07F 17/32 463/16 |
| 6,416,409 | B1 * | 7/2002 | Jordan | 463/27 |
| 6,435,511 | B1 | 8/2002 | Vancura et al. | |
| 6,497,408 | B1 | 12/2002 | Walker et al. | |
| 6,537,150 | B1 | 3/2003 | Luciano et al. | |
| 6,609,970 | B1 | 8/2003 | Luciano, Jr. | |
| 6,616,531 | B1 | 9/2003 | Mullins | |
| 6,702,668 | B2 * | 3/2004 | Banyai | A63F 3/081 273/274 |
| 6,722,978 | B2 | 4/2004 | Valenti | |
| 6,866,584 | B2 | 3/2005 | Michaelson | |
| 6,887,154 | B1 * | 5/2005 | Luciano, Jr. | G07F 17/3258 463/26 |
| 7,056,215 | B1 * | 6/2006 | Olive | G07F 17/32 463/27 |
| 7,192,348 | B2 | 3/2007 | Brosnan et al. | |
| 7,204,756 | B2 * | 4/2007 | Jubinville | G07F 17/329 463/17 |
| 7,666,093 | B2 * | 2/2010 | Lafky et al. | 463/26 |
| 7,959,509 | B2 * | 6/2011 | Saffari et al. | 463/27 |
| 2002/0187825 | A1 * | 12/2002 | Tracy | G07F 17/329 463/17 |
| 2003/0064793 | A1 * | 4/2003 | Baerlocher | G07F 17/3258 463/25 |
| 2003/0148808 | A1 * | 8/2003 | Price | G07F 17/32 463/27 |
| 2003/0178771 | A1 * | 9/2003 | Banyai | A63F 3/065 273/269 |
| 2003/0181232 | A1 * | 9/2003 | Peccole, Jr. | A63F 3/00157 463/13 |
| 2003/0222402 | A1 * | 12/2003 | Olive | G07F 17/32 273/292 |
| 2003/0228899 | A1 * | 12/2003 | Evans | G07F 17/3258 463/25 |
| 2003/0236116 | A1 * | 12/2003 | Marks | G07F 17/3258 463/16 |
| 2004/0053657 | A1 * | 3/2004 | Fiden | G07F 17/3227 463/16 |
| 2004/0072613 | A1 * | 4/2004 | Visocnik | G07F 17/32 463/25 |
| 2004/0102234 | A1 * | 5/2004 | Gold | G07F 17/32 463/13 |
| 2004/0152511 | A1 * | 8/2004 | Nicely | G07F 17/3258 463/27 |
| 2004/0204243 | A1 * | 10/2004 | de Mello Costa | G07F 17/32 463/42 |
| 2004/0224750 | A1 * | 11/2004 | Al-Ziyoud | G07F 17/32 463/17 |
| 2005/0014547 | A1 * | 1/2005 | Gomez | G07F 17/3211 463/16 |
| 2005/0107153 | A1 | 5/2005 | Jubinville et al. | |
| 2006/0089196 | A1 * | 4/2006 | Parham | G07F 17/32 463/27 |

OTHER PUBLICATIONS

Written Opinion of the International Search Authority dated Feb. 10, 2006, in PCT application No. PCT/US04/41772 (5 pages).

Response to Office Action dated Apr. 25, 2006, in U.S. Appl. No. 11/008,533 (16 pages).

Response to Office Action dated Jun. 28, 2007, in U.S. Appl. No. 11/008,533 (5 pages).

Appeal Brief dated Oct. 3, 2007, in U.S. Appl. No. 11/008,533 (21 pages).

Reply Brief dated Feb. 12, 2008, in U.S. Appl. No. 11/008,533 (7 pages).

Response to Examiner's Answer dated Aug. 26, 2009, in U.S. Appl. No. 11/008,533 (16 pages).

* cited by examiner

PROGRESSIVE GAMING SYSTEM, APPARATUS AND METHOD PROVIDING A PRIMARY GAME IN CONJUNCTION WITH AN INDEPENDENT PROGRESSIVE GAME

CROSS-REFERENCE TO RELATED APPLICATIONS

This application is a continuation of U.S. patent application Ser. No. 11/008,533, filed Dec. 9, 2004, now U.S. Pat. No. 7,708,639 which claims the benefit, under 35 U.S.C. §119(e), of U.S. Provisional Patent Application No. 60/530,328 filed Dec. 17, 2003 and entitled "PROGRESSIVE GAMING METHOD, APPARATUS, AND PROGRAM PRODUCT FOR LOTTERY-TYPE GAMING SYSTEMS." The entire content of this provisional application is incorporated herein by this reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all rights of copyright whatsoever.

BACKGROUND OF THE INVENTION

1. Field of the Invention

This invention relates to progressive gaming systems, machines and methods. More particularly, the invention relates to progressive gaming systems, machines and methods embedded with and independent of a primary wagering game.

2. Description of the Related Art

A large number of different gaming machines, systems, and methods have been developed to provide various formats and graphic presentations for conducting games and presenting game results. For example, gaming systems in which players place bets or wagers for a chance at prizes commonly include what are referred to as progressive games. In a progressive game, a portion of each wager made in a game is added to an account or progressive pool to fund one or more special prizes called progressive prizes. Depending upon how many players participate in the game prior to the time a progressive prize is awarded, the value of the progressive prize may be substantial. Progressive prizes can grow to a level significantly higher than the normal results in the underlying game. This is particularly true where the progressive pool is funded by a large number of players. For example, a progressive pool may be funded by player activity at many different sites. Pooling activity from different gaming sites generally increases the number of players adding to the progressive pool and thus increases the value of the progressive prizes available in the system.

Each progressive game is based on certain rules that define how the progressive prize is funded and how a progressive prize is won. Commonly, a progressive pool may be started with some initial or seed value. This seed value ensures a minimum progressive prize, even if the entire progressive pool is awarded on the very first game play before the pool increases proportionally to the wagers made in the game. The progressive game rules may define a progressive prize winner in a number of ways. For example, a particular result in the game may be defined as a progressive prize winner so that a progressive prize is awarded every time a player achieves or obtains that particular result in the game. Alternatively, progressive prizes may be assigned arbitrarily by time, or by some set of predefined conditions.

Progressive games increase player interest and excitement by giving the players the possibility to win large prizes; hence, there continues to be a need for innovated methods and systems for providing progressive games and awards.

SUMMARY OF THE INVENTION

The present invention includes gaming systems, machines and methods with that include generating a set of primary game outcomes and, associating a subset of the primary game outcomes with a set of progressive prize bearing outcomes for an independent progressive game according to a progressive win frequency rule. A primary game outcome is determined in response to a game play request by a player. If the primary game outcome is associated with a winning primary game result, the player is provided a corresponding award from a primary game paytable; independent of the primary game result, if the primary game outcome is associated with one of the progressive prize bearing outcomes, the player is awarded a corresponding progressive prize independent and in addition to any primary game award.

For example, a primary game may be played on a reel-type slot machine, and may comprise a reel-type, Lottery-type or other type of wagering games which may be played with predetermined game records or chances (possible game outcomes), each associated with a result in the game—some winning, some not—some results are associated with some prize while other results are not associated with a prize. By example, to conduct a lottery-type game, a large pool of game records are first produced. Players then participate in the game by purchasing game records or outcomes selected randomly from the large pool of game records. The result associated with each purchased game record or outcome represents the result of that play for the purchasing player.

A progressive gaming method according to the invention includes producing a set of game records (outcomes) with each game outcome being associated with a result in a primary game. Progressive prize bearing outcomes are included in the set of primary game outcomes according to a progressive win frequency rule. Each progressive prize bearing outcome is associated with a progressive win indicator and a progressive prize. After producing the game outcome set, the method includes assigning game outcomes from the game outcome set to a number of players. Each game outcome is assigned to a respective player in response to a game play request associated with the respective player. The method also includes awarding a progressive prize to the respective player to whom a progressive prize bearing outcome is assigned in response to a game play request.

A primary game outcome is selected to be a progressive prize bearing outcome according to the invention preferably without regard to any underlying primary game result associated with the primary game record. In one preferred form of the invention, the progressive prizes are treated identically to non-progressive prizes available in a primary game outcome set in terms of creating the game outcome set. In this form of the invention, the game outcome set is made in a one step process in the sense that both progressive and non-progressive prizes are built into the game outcome set at the same time as the creation of the game outcome set. Other forms of the invention may create a game outcome set in a two-step process including first creating a primary game outcome set containing only non-progressive prizes, that is, prizes having some fixed value unrelated to the number of plays in the game. Once the primary (or basic) game outcome set is created, this form of the invention may include associating some of the previously created game outcomes with a respective progressive prize according to some progressive prize frequency in the game or some target progressive prize distribution.

Alternatively to incorporating progressive prizes with the game outcomes in the game set, some forms of the present invention may tie progressive prizes to a number of game outcomes sold from a game set. In this alternative arrangement, progressive prize indicators are not necessarily associated with specific game outcomes. Rather, one or more numeric values are stored to represent the number of game outcomes that must be sold before a progressive prize is awarded. In this case, the invention may include maintaining a record of the game outcomes sold to identify the progressive prize winning outcomes.

Regardless of whether the progressive prize is associated with a specific game outcome in the game outcome set or is associated with a numerical value representing a number of game outcomes assigned, the present invention includes the step of maintaining the current value of the progressive prize as the game proceeds. This current value of a progressive prize according to the invention is calculated or determined as game outcomes are assigned from the game outcome set. The determination of current progressive prize value may involve incrementing the progressive prize value by some predetermined amount in response to each game outcome purchased in a gaming system prior to the assignment of the progressive prize bearing outcome. Progressive prize pool value may also be calculated or pre-calculated according to the count of game outcomes sold from the game set, the contribution to the pool associated with each game outcome, and any initial pool seed value.

The method of the present invention may be implemented in a slot-type or lottery-type gaming system having a game services system or processing device and a number of player stations in communication with the game services system. The game services system may store the game outcomes and assign a respective game outcome in response to a respective game play request received from one of the player stations. Each player station operates to submit a game play request in response to an appropriate player input at the player station, and receives game outcome information for the respective game outcome assigned by the game services system in response to the game play request. When a progressive prize bearing game outcome is assigned to a player in the system, the game services system sends an appropriate communication to the player's player station so that the player can be notified of the progressive win.

Preferred forms of the invention are implemented with processing devices which operate under the control of program code to perform the various functions included in the invention. Thus, the present invention includes a program product encompassing this computer code stored on one or more suitable computer readable media.

These and other features of the invention will be apparent from the following description of the preferred embodiments, considered along with the accompanying drawings.

DESCRIPTION OF PREFERRED EMBODIMENTS

The present invention may be used with many different types of lottery-type gaming systems. The following description of the present invention will be made in reference to a particular gaming system that will be described below with reference to FIGS. 1 through 3. However, it should be noted that the invention is not limited to any particular gaming system configuration. Rather, the invention may be used in connection with any gaming system.

Figure 1:
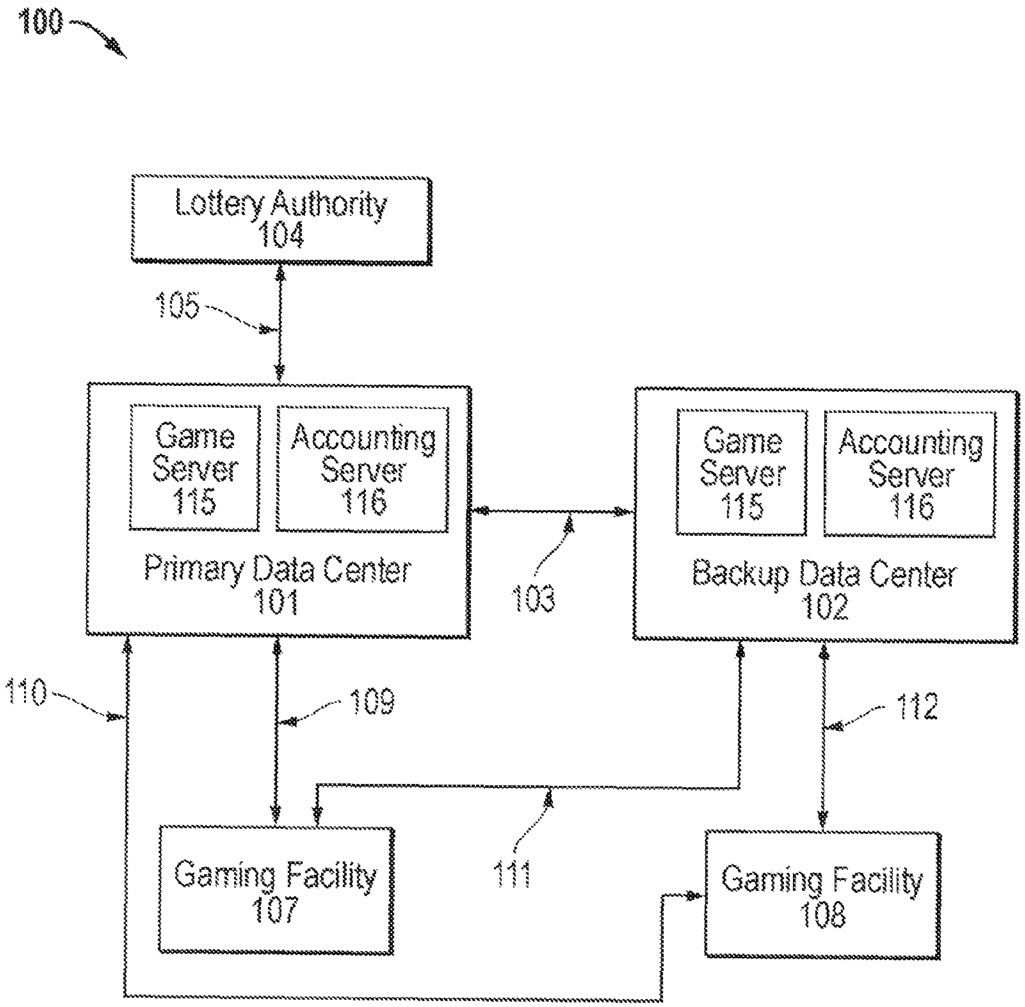
FIG. 1 is a high level diagrammatic representation of a gaming system in which the present invention may be implemented.

Referring to FIG. 1, gaming system 100 includes a primary a data center 101 and a backup data center 102 connected by communication link 103. Gaming system 100 also connects to a lottery authority system 104 through communication link 105. The example system 100 is shown with two gaming sites or gaming facilities 107 and 108 where players may participate in games. It will be appreciated, however, that the invention is not limited to two gaming facilities and may include any number of gaming facilities. Gaming facility 107 is connected for communication to primary data center 101 through communication link 109 while gaming facility 108 is connected for communication to the primary data center through communication link 110. Gaming facility 107 is also connected for communication to backup data center 102 through a backup communication link 111. Gaming facility 108 is similarly connected to backup data center 102 through backup communication link 112. It will be appreciated that the invention is not limited to any particular type of communication links between the various elements of the system provided the communication links can support suitable data transfer rates. It should be noted, however, that preferred forms of the invention may utilize Internet communications for links 109 and 110. The backup data links 111 and 112 may be through satellite or other wireless communications.

Primary data center 101 and backup data center 102 are essentially identical. Backup data center 102 is included in the system as a fallback or failsafe backup system in the event primary data center 101 goes off line for some reason. Each data center 101 and 102 includes a game server system 115 and an accounting server system 116. The game server systems 115 may be responsible for producing game sets according to the invention and may also divide the game sets into subsets for use at the various gaming facilities as will be described further below. The accounting server systems 116 may collect various system wide accounting information, and preferably include suitable database arrangements for collecting and maintaining current value information on system-wide progressive games. System-wide progressive games are those games that may be played at two or more different gaming facilities in the lottery system. These system-wide progressive games are to be distinguished from progressive games that are available only at a single gaming facility. The present invention supports both system-wide and local or gaming site specific progressive games as will be described below with particular reference to FIG. 3.

Those skilled in the art of data processing systems and lottery-type systems will appreciate that data centers 101 and 102 shown in FIG. 1 may commonly include a number of other elements other than the game server system 115 and the accounting server system 116. For example, each data center 101 and 102 may include tape backup arrangements, archiving arrangements, management terminals, and switching or other communication arrangements linking the various elements of the respective data center. These details are not necessary for a description of the present invention and are thus omitted from the present disclosure so as not to obscure the present invention in unnecessary detail.

Figure 2:
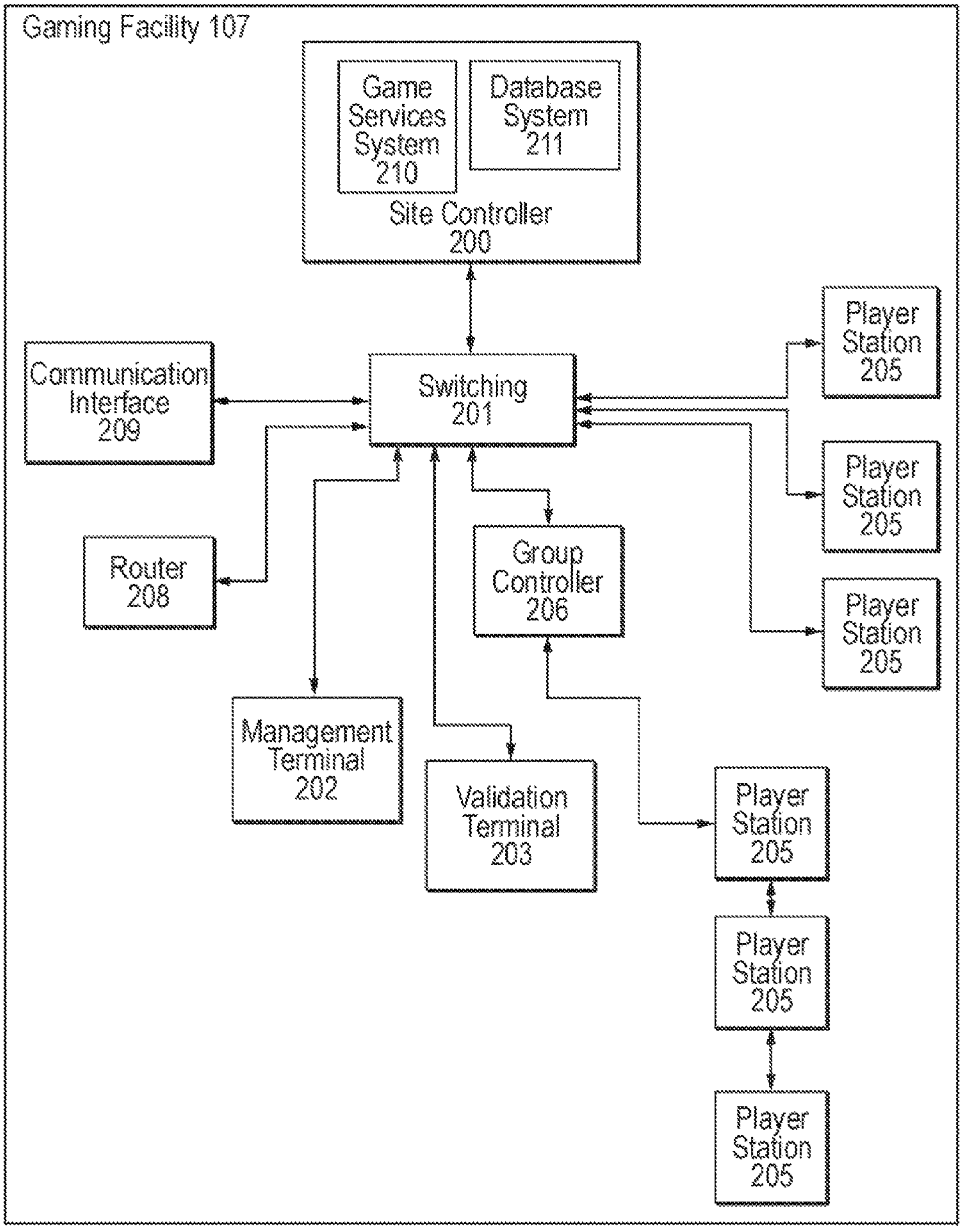
FIG. 2 is a more detailed diagrammatic representation of the gaming facility shown in FIG. 1.

FIG. 2 shows further details of the gaming facility 107 shown in FIG. 1. The gaming facility 107, like the gaming facility 108, includes a site controller 200 connected through a communications or switching arrangement 201 to a number of other elements. The example gaming facility system 107 shown in FIG. 2 includes a management terminal 202, one or more validation terminals 203, and a number of player stations 205. It will be noted that some player stations 205 are connected directly to the switching arrangement 201 such as by a suitable Ethernet networking arrangement while some are connected to the switching arrangement through a group controller 206.

The player stations 205 connected through group controller 206 may be connected together for serial communications under a suitable protocol such as RS-485. Group controller 206 is a suitable controller for implementing the particular communication protocol used by the respective player stations 205 that are connected to the system through the group controller 206. Management terminal 202 provides an interface to the gaming facility system 107 for management and/or maintenance purposes. Validation terminals 203 may be included to implement a suitable game accounting system and may allow players to redeem gaming system credits for cash or other value and/or allow players to purchase gaming system credit. The example gaming facility system 107 may also include a router 208 and a secondary communication interface 209, both connected to switching arrangement 201. The router 208 provides an interface to a communication arrangement linking the respective gaming facility to the primary data center 101 shown in FIG. 1. Secondary communication interface 209 provides an interface to the particular communication arrangement used to provide a communication link with the backup data center 102 shown in FIG. 1.

Player stations 205 each provide a player interface to the gaming facility 107 to allow a player to participate in the various games offered through system 100. In particular, player stations 205 each allow a player to make a suitable input to cause the player station 205 to produce a game play request which is communicated to the site controller 200. Each game play request may include a request for a game record or a chance in the gaming system 100 and may be associated with a wager amount or bet. Further information on the functions performed by player stations 205 will be described below with reference to FIG. 3.

Site controller 200 is shown in FIG. 2 as including a game services system 210 and a database system 211. Each of these systems 210 and 211 may include one or more separate computers or processing devices. Regardless of the particular processing configuration, game services system 210 implements player station services and validation terminal services in the preferred system. These services or processes will be described below with reference to FIGS. 3 and 6. The database system 211 provides database services to support the player station 205 and validation terminal services and will also be discussed further with reference to FIGS. 3 and 6.

Figure 3:
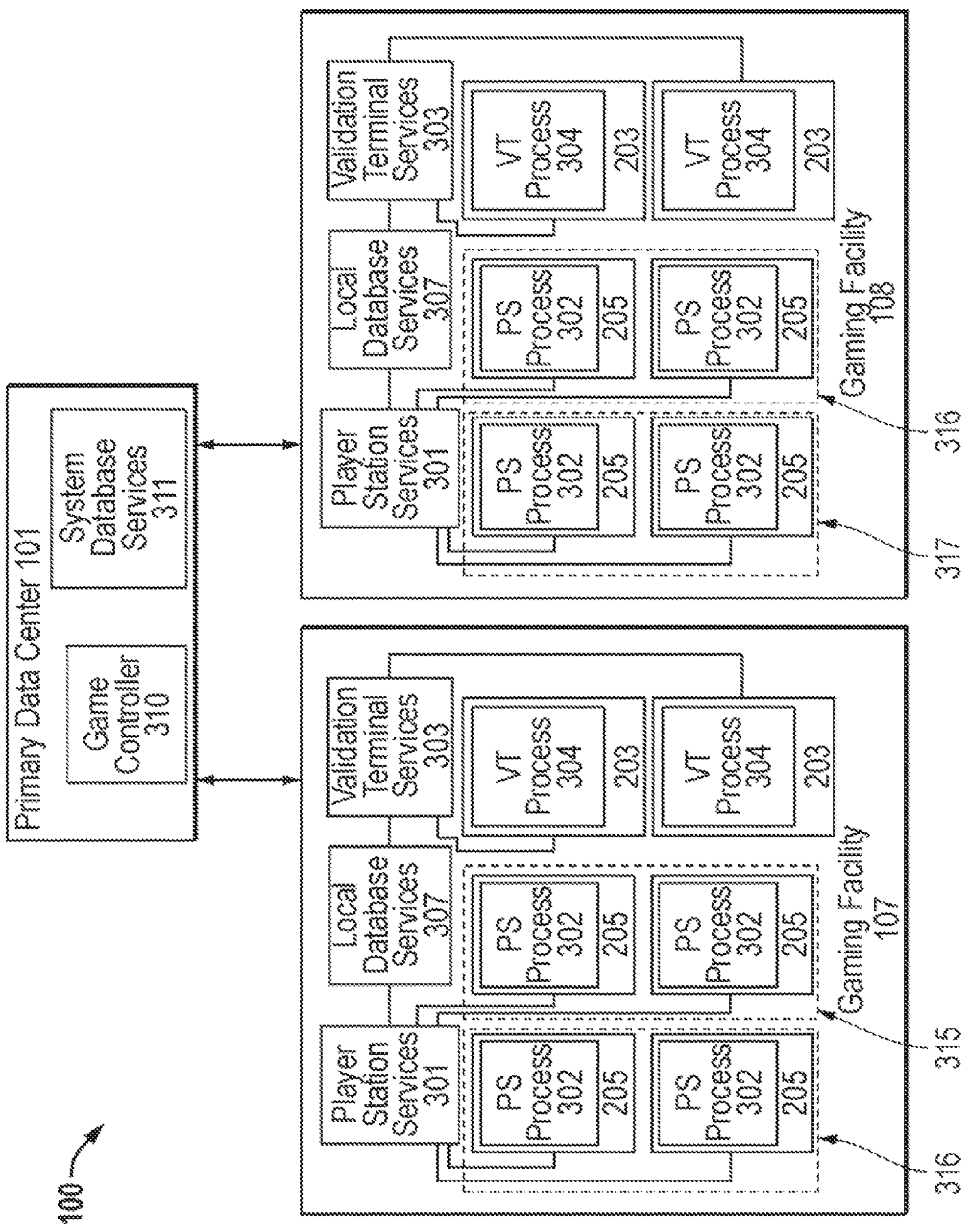
FIG. 3 is a diagrammatic representation showing the cooperation of various services to implement a progressive gaming system embodying the principles of the present invention.

FIG. 3 illustrates certain services or software processes employed in the illustrated gaming facility 107 of FIGS. 1 and 2. Again, it should be noted that the present invention is not limited to two or any other particular number of gaming facilities. The two gaming facilities 107 and 108 of FIG. 1 are shown only as a simple and convenient example to describe the present invention. As shown in FIG. 3, gaming facility 107 provides player station services 301 to support player station functions or processes 302 at the various player stations 205 included at the gaming facility 107. Validation terminal services 303 provide services to support the various validation terminal processes 304 executed at validation terminals 203 included at the gaming facility 107. As described further herein, both the player station services 301 and the validation terminal services 303 rely on a local database service 307 for information such as game play request validity. Gaming facility 108 includes services and processes corresponding to those at the gaming facility 107.

Both gaming facilities 107 and 108 rely on game controller services 310 and system database services 311 preferably provided at a data center such as the primary data center 101 in FIG. 1. In particular, the game controller services 310 may include processes for generating game record sets and providing the game record sets or subsets to the respective gaming facilities 107 and 108 for local storage. The game controller services 310 may also incorporate progressive games into the various game sets according to the invention. The player station services 301 at the gaming facilities 107 and 108 cooperate with the game controller services 310 to ensure that player station services 301 are able to assign a game record from the appropriate game set in response to each valid and authorized game play request from a player station 205.

The player station services 301 provide the same functions at their respective gaming facility 107 and 108. Thus, although the following discussion references only the gaming facility 107, it will be appreciated that the discussion applies with equal force as to the player station services 301 at the gaming facility 108.

The player station services 301 support all functions provided at the respective player stations 205 through the player station processes 302. The player station processes 302 generate a game play request in response to a suitable player input and cause the game play request to be communicated to the player station services 301. The player station services 301 may respond to the game play request by performing or directing accounting functions according to the game accounting arrangement used by the gaming system 100 of FIG. 1. If the player is authorized to make the game play request, the player station services 301 respond to the game play request by assigning a game play record for the request. The player station services 301 also cause sufficient information regarding the game play record to be communicated back to the player station processes 302 to allow the player station processes 302 to reveal the result of the game play record to the player in some suitable fashion. The present invention is not limited to any particular display or arrangement for revealing the result of a game play record to the requesting player. Generally, the player station processes 302 will cause some graphic to be displayed through which the result is revealed. For example, the player station processes 302 may support a reel-type or slot machine-type graphic, card game graphic, or any other suitable game graphic to reveal results to the player.

The player station services 301 rely on the local database services 307 in determining if the particular game play request is valid or appropriate. For example, the local database services 307 may keep a confidential player account indicating the number of system credits available to a player or account owner for making wagers. In response to a game play request entered through a particular player station 205 and the player station processes 302 executed at the player station 205, the player station services 301 may check the data maintained at the local database services 307 to make sure the player has sufficient credits to cover the wager associated with the game play request. The player station services 301 may also direct the database services 307 to update the data for the player's account to record the player's wager associated with the game play request and to track the player winnings associated with the game play record assigned for the game play request.

The validation terminal services 303 provide a similar support for the validation terminal processes 304 to implement a suitable game accounting system. In particular, the validation terminal processes 304 may allow a player to enter a redemption request to redeem gaming system credits for cash. The redemption request may be entered directly by the player or on the player's behalf by a validation terminal attendant. The validation terminal processes 304 executed at the terminal may cause the redemption request to be communicated to the validation terminal services 303 where the redemption request may prompt the validation terminal services 303 to communicate with the local database services 307 to obtain information on the gaming system credits then on record for the player or account owner. This gaming system credit value may be communicated back to the validation terminal processes 304 to allow the player to redeem the gaming system credit for cash at the validation terminal 203.

The local database services 307 also preferably support the progressive gaming method according to the invention by continuously calculating or otherwise determining the current value of a progressive prize for a progressive game played locally at the gaming facility 107. The local database services 307 may also continuously collect data on local contributions to system-wide progressive games. For example, the local database services 307 may keep a running total of the wagers made in a local progressive game that may be used to calculate the current value of a progressive prize available in one or more locally played progressive games. The value of a progressive prize may also be updated through other means such as a running count of game play requests that have been assigned.

The progressive prize value may also be maintained for system-wide progressive games played locally. This local information regarding the system-wide progressive games is communicated to the system database services 311 which is responsible for calculating or determining the current value of the progressive prizes for the system-wide progressive games. This locally collected information for system-wide progressive games may be communicated to the system database services 311 in a number of different manners within the scope of the present invention.

In one embodiment, the system database services 311 periodically poll the various local database services, such as the local database services 307. In some instances, such as the identification of a system-wide progressive prize winner, the various local database services 107 are polled to obtain information necessary to determine the current system-wide progressive prize value. Alternatively, the local database services 307 may periodically push collected data to the system database services 311.

Other embodiments may use a combination of polling from the system database service 311 and pushing data from the local database services 307. For example, the local database services 307 may periodically push progressive prize value data to the system database services 311, and then when a progressive prize is detected in the system, the system database services 311 may poll the local database services 307 to obtain final contribution data for the progressive prize. An example of the manner in which progressive prize value data may be collected is described with reference to FIG. 5.

It will be appreciated that the player station services 301, the validation terminal services 303, and the local database services 307 may each include other functions such as additional game accounting functions. Details on these additional functions are omitted from the present disclosure so as not to obscure understanding of the disclosed progressive gaming methods.

FIG. 3 illustrates examples of three different progressive games that are in play in the gaming system 100. A first progressive game is in play at gaming facility 107 through the player stations 205 that are grouped within dashed line box 315. A second progressive game is in play across both of the gaming facilities 107 and 108, that is, through the player stations 205 shown in dashed line box 316 at gaming facility 107 and the player stations 205 shown in dashed line box 316 at gaming facility 108. A third progressive game is available through the player stations 205 included in dashed line box 317 at gaming facility 108.

According to principles of the present invention, the progressive games 315 and 317 are local progressive games because they are each in play locally at a single gaming facility only, that is, at gaming facilities 107 and 108, respectively. On the other hand, the progressive game 316 is a system-wide progressive game because it is available through two or more gaming facilities in the gaming system 100, that is, through both gaming facilities 107 and 108.

Figure 4:
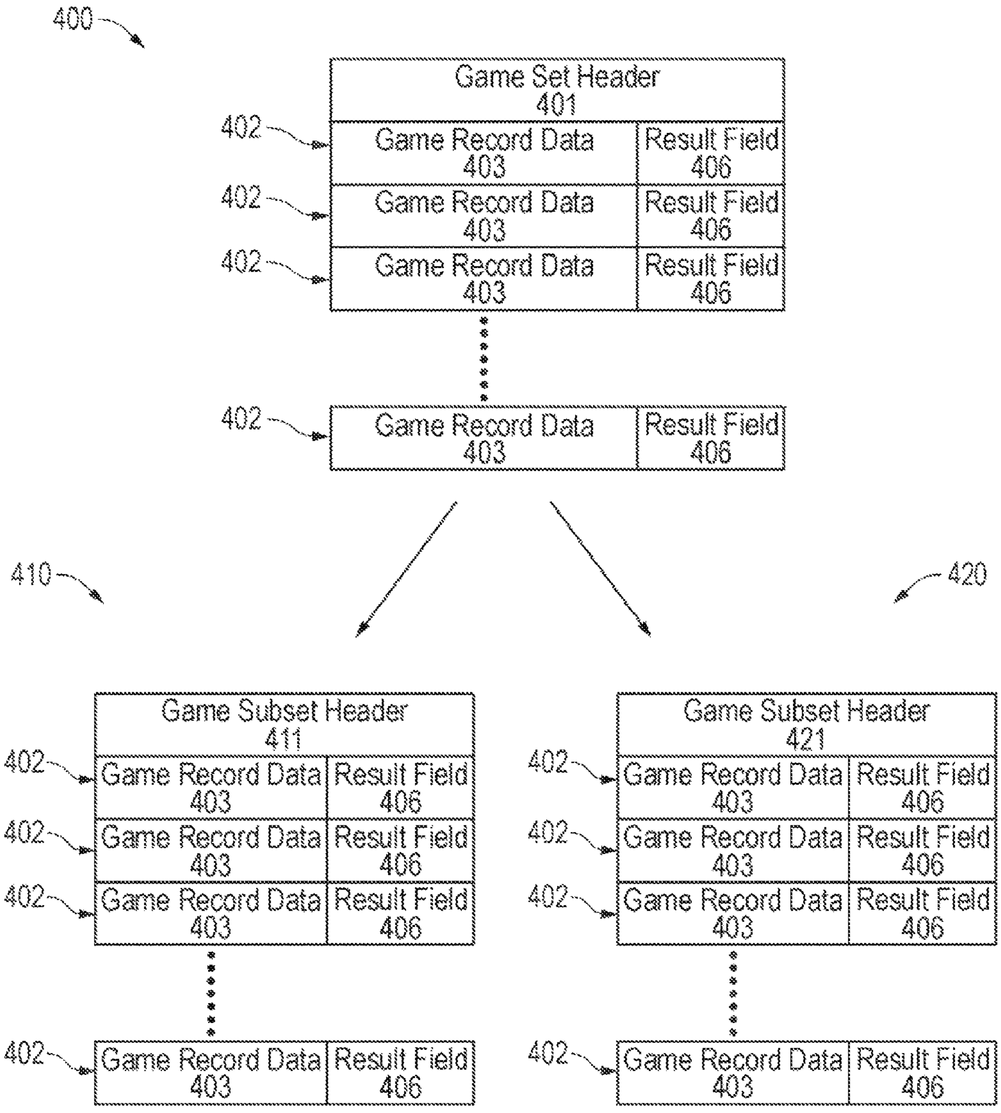
FIG. 4 is a diagrammatic representation of a game record set used in the present invention.

FIG. 4 shows a representation of a game record set 400 that may be used according to principles of the present invention. The game record set 400 comprises a data file preferably including a game set header 401 and a number of individual game records 402. The game record set 400 may include a very large number of game records 402, on the order of many thousand, for example. However, the invention is not limited to any particular size of the game record set 400. Each game record 402 includes a field 403 containing game record data. This game record data field 403 preferably identifies the game record 402 and may include additional information such as a result field 406 that indicates the result associated with the respective game record 402. The result field 406 may comprise a prize index value described further below with reference to FIG. 5. Alternative forms of the invention may also include a field for a progressive prize indicator although this alternate field is not shown in FIG. 4. When used, the progressive prize indicator indicates whether the particular game record 402 is associated with a progressive prize. The progressive prize indicator may be as simple as a single bit that may be set to indicate that the game record 402 is a progressive prize bearing record or cleared to show that no progressive prize is associated with the game record 402.

Game records 402 may be used in lottery systems where the lottery system may communicate all game records 402 to the gaming facilities 107 and 108 for use by the player station services 301 of FIG. 3 in servicing game play requests. However, large game record sets such as the game record set 400 may be randomized and divided into smaller subsets which are then communicated to various gaming facilities for use in responding to game play requests. Two different game record subsets 410 and 420 are shown in FIG. 4 for purposes of example. The game record subset 410 preferably includes a game subset header 411 and a number of individual game play records 402 from the overall game record set 400. The individual game play records 402 each include the game record data 403 as well as the result field 406. The game record subset 420 includes a similar structure with a game subset header 421 and a number of game play records 402 divided out from the overall game record set 400 and including the game record data 403 and the respective result field 406.

Game record sets such as set 400 are created according to particular rules for a game to provide some goal or set of goals. Game record set development rules may call for a certain overall payout and hold, and may also call for certain win frequency or win frequency at one or more prize levels. Different game rules will produce different odds of obtaining winning game play records during the course of play. Generally, each game record set 400 will include a relatively few number of large prize winning records and a relatively larger number of lower prize winning records in addition to a still larger number of losing records that are not associated with any prize.

One preferred form of the invention uses two prize definition files in creating game play record sets according to the present invention. A first prize definition file comprises a prize table having an entry for each different type of prize available in the game record set. Each entry includes a field for a prize index unique to the respective entry, a field for a prize value, and a field for a frequency value for the overall frequency with which the particular prize is to be awarded. The frequency may be expressed in terms of a ratio between the number of times the prize is to be awarded in a given number of game play requests, for example, one in 50,000, one in 1000, or some other ratio.

The second prize definition file in this preferred form of the invention comprises a progressive game table having a separate entry for each progressive game implemented in the system. Each entry in this progressive game table includes a field for a seed value with which the progressive prize starts, a field for a contribution percentage for each wager in the progressive game, and a field for the prize index or indices that represent a progressive game win.

In the preferred form of the invention utilizing the prize table and progressive game table, no separate progressive prize indicator is required in each game play record. Rather, the prize index included in each game play record indicates whether or not the game play record is a progressive prize winner in addition to whether or not the record is a regular game winner or loser. This preferred form of the invention essentially builds the progressive prizes into the game record set in a single step as the game record set is created.

It will be noted that different game record sets may be considered separate lottery-type games. Some player stations such as those shown at 205 in FIG. 2 may be dedicated to particular games that require game records from a certain type of game record set. Alternatively, certain game presentations available at player stations 205 may use game records from different types of game record sets. Wagers at different levels from a given player station 205 may require game play records from different game record sets. Thus, it will be appreciated that player station services such as the player station services 301 in FIG. 3 may require access to many different game record sets or game record subsets in order to service the different player stations 205 available at the gaming facility 107.

It will be noted that when considering the wager for a particular game record that may be known in advance, all that is necessary to determine the value of a progressive pool aside from any seed value is a count of game records that have been purchased/assigned from the game record set. The progressive prize pool value will be equal to the count of game records purchased multiplied by the contribution to the progressive prize per game play record plus any seed value for the progressive pool. It will also be noted that progressive prize value at any count may be precalculated and stored in a table related to a particular game record count. The value of the progressive prize may then be determined at any given count of assigned/purchased game records by looking up the count in the table and retrieving the associated progressive prize value.

It will also be noted that if the game records are assigned from a particular game record set in a known sequence, the value of the progressive prize at any point in the game record set will be predetermined. However, if the game record sets are divided into subsets and distributed to various gaming facilities or different player station services at a particular gaming facility, the game records will not necessarily be assigned in any known order in the overall game record set. In this case, the value of the progressive prize cannot be determined simply by looking at the sequence of the game records in the game record set. Rather, the value of the progressive prize may be determined by keeping track of each game record from the game record set that has been purchased/assigned and adding the progressive portion of the wager to the value of the progressive prize.

One preferred form of maintaining information on contributions to a progressive prize involves maintaining one or more progressive prize contribution tables for each progressive game. For system-wide progressive games, a local contribution table is preferably maintained by the local database services such as the local database services 307 in FIG. 3 at each gaming facility offering the particular system-wide progressive game, and a system contribution table is preferably maintained by the system database services 311 in FIG. 3. For progressive games available only at a single gaming facility, only a single local contribution table is required in this particular form of the invention.

Figure 5:
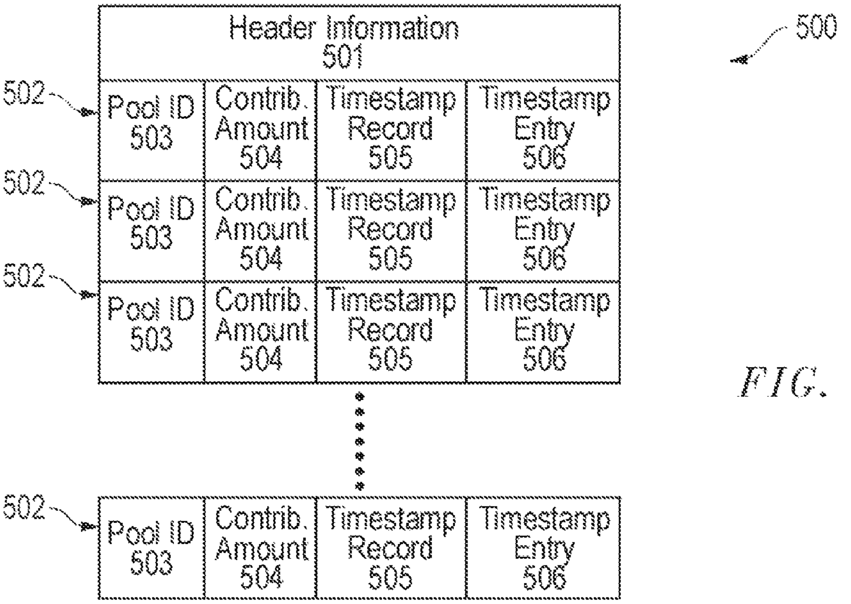
FIG. 5 is a representation of a progressive prize contribution table used in one preferred form of the present invention.

FIG. 5 shows a representation of a local progressive contribution table 500 for a particular progressive game according to one preferred form of the invention. The local progressive contribution table 500 includes header information 501 and an entry 502 for each game record purchased from the respective game set incorporating a progressive game. Each entry 502 includes a pool identifier field 503 for identifying the pool or record set from which the record was assigned, a contribution amount field 504 for the particular record, a timestamp record field 505 associated with the assignment of the particular record, and a timestamp value field 506 for the time the contribution table entry was made.

In a preferred form of the invention, in response to the assignment of a game record from the game record set (or dispensing of a result from a game record) a new entry 502 is created for the local progressive contribution table 500. Where the table 500 is for a system-wide progressive game, the table 500 entries are communicated to the system-wide database services 311 of FIG. 3, preferably periodically without intervention from the system-wide database services 311. The system-wide database services 311 may summarize the data and then make a summary entry in a similar system-wide contribution table at the system-wide database services 311, or may simply add the individual entries to a system-wide contribution table similar to the local progressive contribution table 500 along with entries from other local database services 307. System database services 311 may periodically calculate a total current progressive prize value and broadcast the value to the various local player station services 301 to be communicated for display at the various player stations 205.

When a progressive prize winning record is dispensed, as indicated by the particular prize index read from a game play record assigned to a player in the gaming system, the assigning player station services 301 notifies system database services 311. The system database services 311 respond by instructing all of the local database services 307 to finish collecting data according to the timestamp value field 506, and communicate the final local progressive contribution table 500 entries from the respective local database service 307 to the system database services 311. Once all of the progressive prize data (contribution table entries) are communicated to the system database services 311, these services may calculate the final progressive prize value (including any initial seed value) and communicate that value to the player station services 301 in FIG. 3 in communication with the player station 205 that was assigned the progressive winning record so that the progressive prize value may be communicated to the player station 205 and awarded to the player according to the accounting system being employed.

A similar process to that described above for system-wide progressive games may be employed for local progressive games except no communications with the system database services 311 are required to calculate the final progressive prize value. The local database services 307 may calculate the final progressive prize directly from the collected data (entries of local contribution table 500) together with information on any initial seed value. Whether a system-wide progressive game or a local progressive game, the services responsible for calculating the progressive prize value preferably consult the progressive game table for a seed value to start a new progressive prize immediately after a progressive prize has been awarded.

Figure 6:
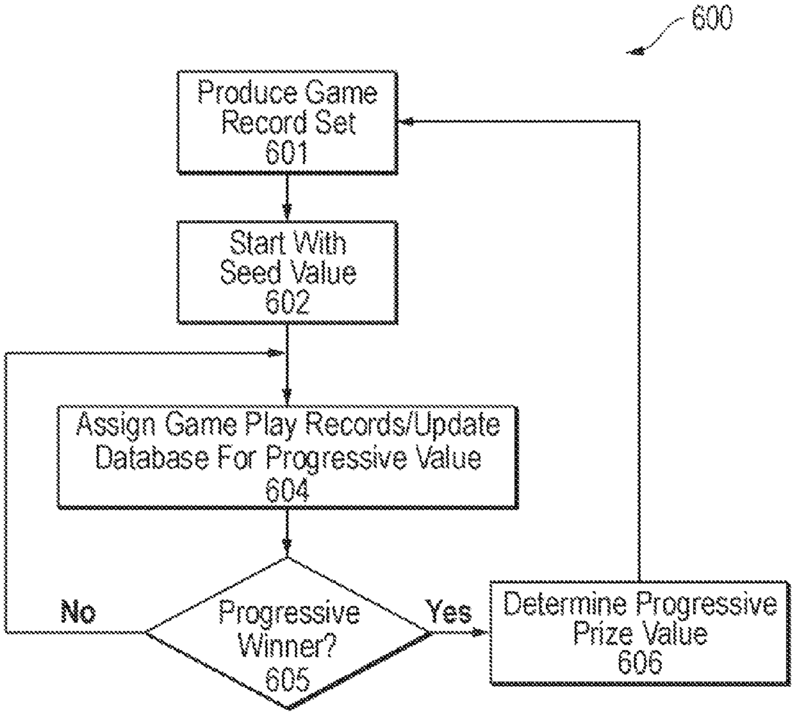
FIG. 6 is a diagram showing process steps according to the present invention.

FIG. 6 shows a general process 600 of conducting a progressive game according to one embodiment of the present invention. The method first includes producing a set of game records as indicated at process block 601. This set of game records may take the form of that shown in FIG. 4. In any event, each game record will be associated with a result preferably in the form of a prize index value.

A method according to the invention may include adding a seed value initially to a progressive prize as indicated at process block 602. After seeding the progressive prize with any seed value, the process includes assigning game records from the set of game records as indicated at process block 604. The method may include updating a progressive prize value each time a game record is assigned at the step shown at process block 604. If the assigned game record is not a progressive winner, that is, does not comprise a progressive prize bearing record, the process branches from decision block 605 and returns to assign the next game record from the set. However, if the assigned game record comprises a progressive prize bearing record, the process branches from decision block 605 to process block 606 to determine the value of the progressive prize and award the prize to the player that has been assigned the progressive prize bearing record.

The step of determining the progressive prize value at process block 606 may take several different forms within the scope of the present invention in addition to the process described above in relation to the progressive prize contribution table 500. In the event that game records are assigned from the set in a particular sequence, the step of determining the progressive prize value may include simply analyzing the sequence of the assigned progressive prize bearing record. If game records may be assigned from any game record set out of sequence, the step of determining the progressive prize value for any particular progressive prize bearing record requires maintaining a count or running total of all game records to have been assigned from the set prior to the assignment of the progressive prize bearing record. This count or running total is preferably maintained in the various database services shown in FIG. 3.

For progressive games that are played locally such as progressive games 315 and 317 shown in FIG. 3, the progressive prize value may be determined using data collected by the local database service (such as service 307) at the particular gaming facility. However, system-wide progressive games, such as progressive game 316 in FIG. 3, that are played through multiple gaming facilities require a central location for determining the progressive prize value. In the preferred form of the invention, system database service 311 maintains data regarding the game records assigned from a particular game set and the total current value of the progressive prize as discussed above in relation to a system-wide contribution table similar to the contribution table 500.

There are numerous variations in the manner in which the progressive system may be administered within the scope of the present invention. In one preferred form of the invention when the gaming system 100 detects that a particular player station has been assigned a progressive prize bearing record, the system 100 replaces the result in the game record data for that particular record with the then current amount in the progressive prize pool for that progressive game. The system 100 then sends the modified game record to the particular player station 205 and notifies the other player stations 205 participating in the progressive game of the win. The system 100 then resets the progressive pool to the initial pool size or seed value if any.

Depending upon the time granularity with which game play requests may be distinguished in a particular system, it is possible for two game play requests to be entered at nearly the same time and thus represent an apparent tie for a particular progressive prize bearing game record. An apparent tie may be handled in a number of different ways within the scope of the present invention. In one preferred arrangement, a winner will be determined by a unique system timestamp value assigned to each game play request. The first request registered based on the timestamp value will be declared the winner and will be awarded the then current progressive prize value. The additional game play requests representing an apparent tie may be awarded the seed amounts plus a small extra amount representing the player's particular contribution to the progressive prize pool.

The above described preferred embodiments are intended to illustrate the principles of the invention, but not to limit the scope of the invention. Various other embodiments and modifications to these preferred embodiments may be made by those skilled in the art without departing from the scope of the present invention. For example, although a particular hardware arrangement is shown for purposes of describing the invention, it will be appreciated that numerous hardware arrangements are possible for implementing the present invention. Also, although the operational software-controlled process steps are described as occurring at certain processing elements in the system, the processing steps may be distributed in any suitable fashion over various data processing elements.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The invention claimed is:

1. A method of operating a primary wagering game together with an independent progressive game through an electronic gaming system, the method including:

(a) creating a set of predetermined primary game outcomes of the primary wagering game, each predetermined primary game outcome being associated with a respective primary game result, and a first one of the predetermined primary game outcomes being associated with a first progressive game result which is a winning result for a progressive game and is independent of the primary game result for the first one of the predetermined primary game outcomes;

(b) storing the set of predetermined primary game outcomes at one or more data processing devices of the electronic gaming system;

(c) responsive to a game play request communicated from a first gaming device included in the electronic gaming system, and after the set of predetermined primary game outcomes is created and stored at the one or more data processing devices of the electronic gaming system, assigning a respective one of the predetermined primary game outcomes and communicating game outcome information for that assigned predetermined primary game outcome to the first gaming device from one of the one or more data processing devices, the communicated game outcome information for that assigned predetermined primary game outcome indicating whether the primary game result associated with that assigned predetermined primary game outcome is a primary game winning result and indicating whether that assigned predetermined primary game outcome comprises the first one of the predetermined primary game outcomes and is thus associated with the first progressive game result;

(d) paying an award through the first gaming device based on the respective primary game result associated with the assigned predetermined primary game outcome; and (e) if the assigned predetermined primary game outcome comprises the first one of the predetermined primary game outcomes associated with the first progressive game result, paying a first progressive award.

2. The method of claim 1 wherein the first progressive game result is conditionally associated with the first one of the predetermined game outcomes.

3. The method of claim 1 wherein the first progressive game result is unconditionally associated with the first one of the predetermined game outcomes.

4. The method of claim 1 wherein a second one of the predetermined primary game outcomes is associated with a second progressive game result which is a winning result for a second progressive game and is independent of the predetermined primary game result for the second one of the predetermined primary game outcomes.

5. The method of claim 1 wherein the primary game comprises a lottery game, the steps including:

providing a lottery game presentation at the gaming device.

6. The method of claim 1 further including displaying the respective primary game result associated with the assigned predetermined primary game outcome through a corresponding reel-based wagering game presentation.

7. The method of claim 1 further including:

randomly or pseudo-randomly selecting the assigned predetermined primary game outcome.

8. The method of claim 1 including the step of:

maintaining a current value for the first progressive award as a function of the number of game requests received from one or more players at one or more respective gaming devices included in the electronic gaming system.

9. The method of claim 1 wherein the primary game outcome information includes a single index value.

10. The method of claim 2 wherein paying the first progressive award is conditioned on a predetermined number of predetermined primary game outcomes having been assigned in the primary game.

11. The method of claim 4 including the steps of:

responsive to a game play request communicated from a second gaming device included in the electronic gaming system, and after the set of predetermined primary game outcomes is created and stored at the one or more data processing devices of the electronic gaming system, assigning an additional one of the predetermined primary game outcomes and communicating game outcome information for that additional one of the predetermined primary game outcomes to the second gaming device from one of the one or more data processing devices, the communicated game outcome information for that additional one of the predetermined primary game outcomes indicating whether the primary game result associated with that additional one of the predetermined primary game outcomes is a respective primary game winning result and indicating whether that additional one of the predetermined primary game outcomes is the second one of the predetermined primary game outcomes and is thus associated with the second progressive game result;

paying a second award through the second gaming device based on the respective primary game result associated with the additional one of the predetermined primary game outcomes;

if the assigned additional one of the predetermined primary game outcomes comprises the second one of the predetermined primary game outcomes, paying a second progressive award.

12. The method of claim 5, the lottery game presentation step including:

displaying the respective primary game result associated with the assigned predetermined primary game outcome through a corresponding reel-based wagering game presentation.

13. The method of claim 7 wherein selecting the assigned predetermined primary game outcome includes:

remotely selecting the assigned predetermined primary game outcome.

14. The method claim 8, the current value maintaining step including:

initializing the first progressive award with a seed value.

* * * * *